(12) United States Patent
Springer et al.

(10) Patent No.: US 9,376,967 B2
(45) Date of Patent: *Jun. 28, 2016

(54) AUTO-IGNITION INTERNAL COMBUSTION ENGINE WITH PARTIAL DEACTIVATION AND METHOD FOR THE OPERATION OF AN INTERNAL COMBUSTION ENGINE OF SAID TYPE

(71) Applicant: Ford Global Technologies, LLC, Dearborn, MI (US)

(72) Inventors: Moritz Klaus Springer, Hagen (DE); Albert Breuer, Cologne (DE); Thomas Lorenz, Cologne (DE); Helmut Hans Ruhland, Eschweiler (DE); Jan Linsel, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 445 days.

This patent is subject to a terminal disclaimer.

(21) Appl. No.: 13/860,450

(22) Filed: Apr. 10, 2013

(65) Prior Publication Data

US 2013/0276755 A1    Oct. 24, 2013

(30) Foreign Application Priority Data

Apr. 24, 2012   (EP) ..................................... 12165339

(51) Int. Cl.
*F02D 17/02*    (2006.01)
*F02D 41/00*    (2006.01)
(Continued)

(52) U.S. Cl.
CPC ................ *F02D 17/02* (2013.01); *F02D 15/00* (2013.01); *F02D 41/0087* (2013.01); *F02B 73/00* (2013.01)

(58) Field of Classification Search
CPC . F02D 41/0087; F02D 41/042; F02D 41/123; F02D 17/02; F02D 9/00; F02D 41/008–41/87
USPC ....................................................... 123/198 F
See application file for complete search history.

(56) References Cited

U.S. PATENT DOCUMENTS 3,902,472 A  *  9/1975  Baugelin .................. 123/179.19
4,455,984 A       6/1984  Merlini et al.
(Continued)

FOREIGN PATENT DOCUMENTS

DE           665392 C      9/1938
GB         2478718 A      9/2011
(Continued)

OTHER PUBLICATIONS

Springer, Moritz Klaus et al., "Internal Combustion Engine with Partial Deactivation and Method for the Operation of an Internal Combustion Engine of Said Type," U.S. Appl. No. 13/860,443, filed Apr. 10, 2013, 33 pages.

*Primary Examiner* — Lindsay Low
*Assistant Examiner* — Robert Werner
(74) *Attorney, Agent, or Firm* — Julia Voutyras; Alleman Hall McCoy Russell & Tuttle LLP (57) ABSTRACT

Methods and systems are provided for optimizing the operation of a multi-cylinder auto-ignition internal combustion engine. In one example, cylinders of the auto-ignition internal combustion engine may form two groups of cylinders, where one group of cylinders has a larger compression ratio, smaller width, and smaller volume than the other group of cylinders, and where at least one cylinder of the other group is configured as a switchable cylinder that is deactivated in a load-dependent manner. By configuring the cylinders in multiple groups based on compression ratios, and operating the cylinders in a load-dependent manner, fuel consumption may be optimized.

7 Claims, 4 Drawing Sheets

(51) Int. Cl.
  *F02D 15/00*  (2006.01)
  *F02B 73/00*  (2006.01)

(56) References Cited

U.S. PATENT DOCUMENTS

| | | | |
|---|---|---|---|
| 8,468,823 B2 * | 6/2013 | Hitomi | F02D 41/3035 |
| | | | 123/564 |
| 2005/0034701 A1 * | 2/2005 | Betz et al. | 123/198 F |
| 2005/0131618 A1 * | 6/2005 | Megli et al. | 701/101 |
| 2007/0131183 A1 * | 6/2007 | Shei | F02B 73/00 |
| | | | 123/48 R |
| 2011/0011061 A1 * | 1/2011 | Yamakawa et al. | 60/285 |
| 2011/0155106 A1 * | 6/2011 | von Mayenburg | 123/48 B |
| 2013/0276747 A1 * | 10/2013 | Springer et al. | 123/319 |

FOREIGN PATENT DOCUMENTS

| | | |
|---|---|---|
| JP | H03275949 A | 12/1991 |
| JP | H05296061 A | 11/1993 |
| WO | 03067059 A1 | 8/2003 |

* cited by examiner

AUTO-IGNITION INTERNAL COMBUSTION ENGINE WITH PARTIAL DEACTIVATION AND METHOD FOR THE OPERATION OF AN INTERNAL COMBUSTION ENGINE OF SAID TYPE

CROSS REFERENCE TO RELATED APPLICATIONS

The present application claims priority to European Patent Application No. 12165339.8, filed on Apr. 24, 2012 the entire contents of which are hereby incorporated by reference for all purposes.

FIELD

The present disclosure relates to systems and methods for optimized operation of auto-ignition internal combustion engine with partial deactivation.

BACKGROUND AND SUMMARY

In the development of internal combustion engines, it is a basic aim to minimize fuel consumption, wherein improved overall efficiency is at the focus of the efforts being made.

Even though diesel engines, that is, one example of auto-ignition internal combustion engines, owing to the quality regulation which they use, have higher efficiency, that is, lower fuel consumption, than Otto-cycle engines in which the load is set by means of quantity regulation by means of the charging of the cylinders with fresh mixture, there is potential for improvement, and a demand for improvement, with regard to fuel consumption and efficiency in the case of diesel engines too.

One concept for reducing fuel consumption is deactivation of individual cylinders in certain load ranges. Efficiency of the diesel engine in part-load operation can be improved, by means of partial deactivation, because in case of constant engine power, deactivation of at least one cylinder of a multi-cylinder internal combustion engine increases load on other cylinders still in operation, such that said cylinders operate in regions of higher loads, in which specific fuel consumption is lower. The load collective in part-load operation of the diesel engine is shifted toward higher loads.

Cylinders which continue to be operated during partial deactivation furthermore tolerate higher exhaust-gas recirculation rates owing to greater mass of fuel supplied.

Further advantages with regard to efficiency result in that a deactivated cylinder, owing to the absence of combustion, does not generate any wall heat losses owing to heat transfer from combustion gases to combustion chamber walls.

Multi-cylinder internal combustion engines with partial deactivation described in prior art, and associated methods for operating said internal combustion engines, nevertheless have considerable potential for improvement.

The inventors herein have identified the above issues and potential for improvement in the operation of internal combustion engines. In one example, partial deactivation of auto-ignition internal combustion engine may be optimized, at least by an auto-ignition internal combustion engine comprising: at least two cylinders, in which at least two cylinders are configured so as to form at least two groups with in each case at least one cylinder, the at least one cylinder of at least one group being formed as a cylinder that can be switched in a load-dependent manner, wherein at least two groups are characterized by different compression ratios $\epsilon_i$, at least one cylinder of a first group having a compression ratio $\epsilon_1$ and at least one cylinder of a second group having a compression ratio $\epsilon_2$, where $\epsilon_2 < \epsilon_1$.

Cylinders of at least one group are formed so as to be switchable, which permits not only an activation but rather, in particular, switching and if appropriate a later—then new—activation.

For example, during part-load operation of the internal combustion engine, that is, at low and if appropriate medium loads, at least one cylinder of one group is deactivated while at least one cylinder of at least one other group continues to be operated. If a predefinable load is undershot, a partial deactivation thus takes place, as a result of which load demand on at least one cylinder which remains in operation is increased, leading to advantages already described above. The power demand on the cylinders which are still in operation during the partial deactivation increases, such that said cylinders are operated at higher loads with a lower specific fuel consumption. Furthermore, a deactivated cylinder does not generate any wall heat losses, and thus does not contribute to efficiency losses as a result of heat transfer into the engine structure.

Additionally, since efficiency correlates with compression ratio of cylinder, part-load operation of the diesel engine may be further improved by having cylinder groups with different compression ratios.

In this way, by utilizing multiple cylinder groups with different efficiencies, part-load operation of auto-ignition internal combustion engine may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

The subject matter of the present disclosure will be better understood from reading the following detailed description of non-limiting embodiments, with reference to the attached drawings.

DETAILED DESCRIPTION

Figure 1:
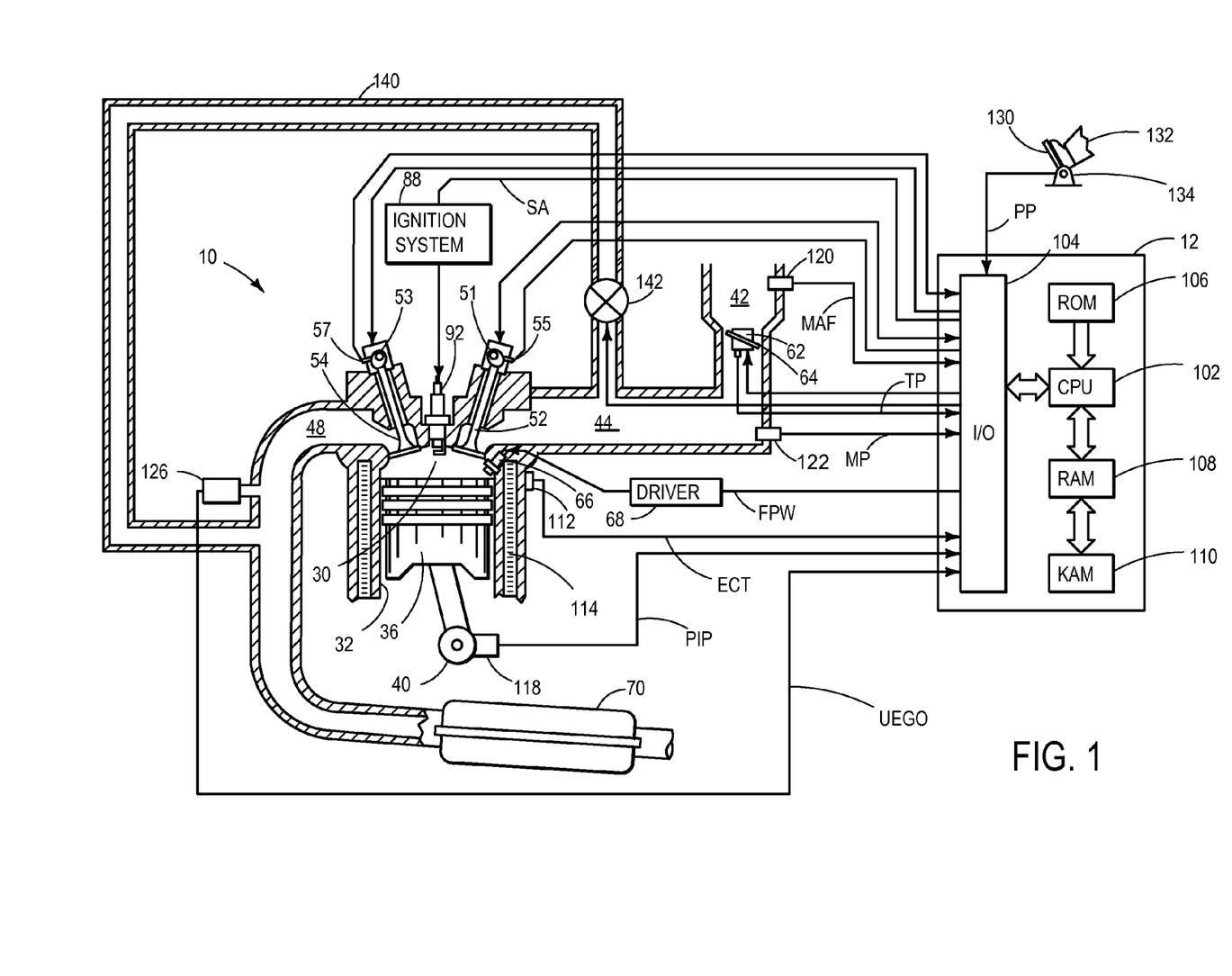
FIG. 1 shows a schematic representation of an internal combustion engine.

Methods and systems are provided for operation of an internal combustion engine, such as engine system of FIG. 1. The internal combustion engine of FIG. 1 may be configured as described at FIG. 2. Operation of the internal combustion engine may be optimized with regard to fuel consumption, according to routines described in flow charts of FIGS. 3 and 4.

Referring to FIG. 1, internal combustion engine 10 comprises of a plurality of cylinders, one cylinder of which is shown in FIG. 1. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. The direct fuel injector may be intruding into the combustion chamber for introduction of fuel. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 for providing mass air flow MAF signal to controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, an exhaust gas recirculation (EGR) system may route a desired portion of exhaust gas from exhaust passage 48 to intake manifold 44 via EGR passage 140 through EGR valve 142 and EGR orifice (not shown). The exhaust gas recirculated through the EGR system may be directed to all the cylinders present in the multi-cylinder engine through intake manifold 44. In a turbocharged engine, the EGR system may be a high-pressure system (from upstream of the turbine to downstream of the compressor) or a low-pressure EGR system (from downstream of the turbine to upstream of the compressor).

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

For example, engine 10 may be controlled to vary operation between a spark ignition (SI) mode and a homogeneous charge compression ignition (HCCI) mode. In SI mode of combustion, ignition system 88 provides an ignition spark to combustion chamber 30 via spark plug 92 in response to spark advance signal SA from controller 12. While SI combustion may be utilized across a broad range of engine torque and speed it may produce increased levels of NOx and lower fuel efficiency when compared with other types of combustion. Alternately, engine 10 may opt to perform an HCCI mode of combustion, wherein an air and fuel mixture achieves a temperature where combustion occurs by auto-ignition without requiring a spark by a sparking device. During HCCI mode, or a controlled auto-ignition (CAI) mode, auto-ignition of combustion chamber gases occur at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio. Various operating conditions of the engine may be altered to provide different combustion modes, such as fuel injection timing and quantity, EGR, valve timing, valve lift, valve operation, valve deactivation, intake air heating and/or cooling, turbocharging, throttling, etc. In still other examples, the engine may operate according to a diesel combustion cycle with autoignition of diesel fuel upon injection.

Further, engine system 10, comprising of multiple cylinders may be controlled by controller 12 depending on load conditions.

In this way, engine system described above may be configured to form an auto-ignition internal combustion engine comprising of multiple cylinders that may be controlled in a load-dependent manner.

Figure 2:
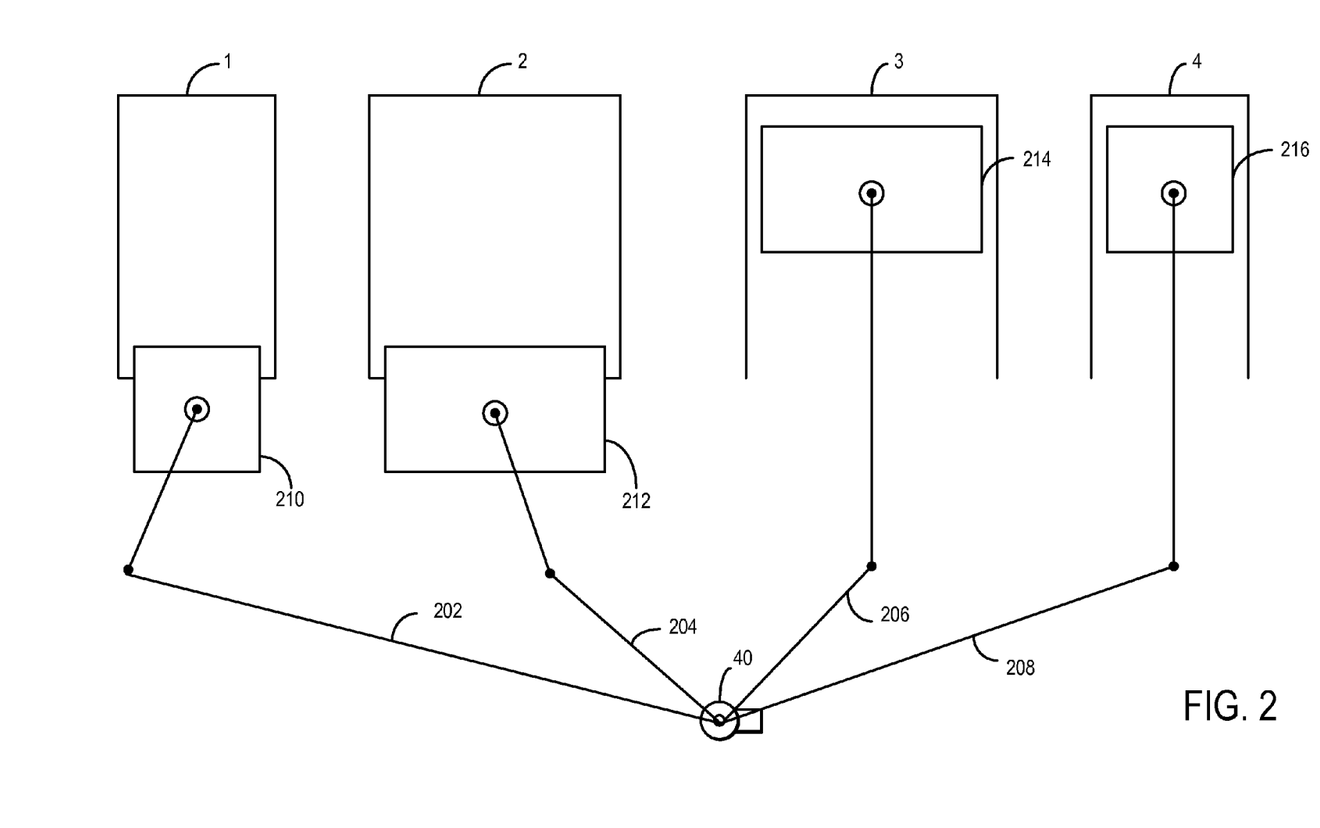
FIG. 2 shows a schematic representation of different cylinder groups of an internal combustion engine.

Turning to FIG. 2, it schematically illustrates four cylinders 1, 2, 3, 4 of a four-cylinder in-line auto-ignition engine.

The four cylinders 1, 2, 3, 4 which are in an in-line configuration form two cylinder groups with in each case two cylinders 1, 2, 3, 4, wherein the first group comprises the outer cylinders 1, 4 and the second group comprises the inner cylinders 2, 3. Outer cylinders 1, and 4, belonging to group 1, may have width smaller than the inner cylinders 2, and 3, belonging to group 2. Each cylinder may be coupled to a common crankshaft through a connecting rod. For example, connecting rods 202, 204, 206, and 208, may couple cylinders 1, 2, 3, and 4 respectively, to crankshaft 40.

In the snapshot shown, the pistons 210, 212 of the first and second cylinders 1, 2 are situated at bottom dead center, and the pistons 214, 216 of the third and fourth cylinders 3, 4 are situated at top dead center.

The two cylinder groups are characterized by different compression ratios, wherein the cylinders 1, 4 of the first group have a compression ratio $\epsilon_1$ and the cylinders 2, 3 of the second group have a compression ratio $\epsilon_2$, where $\epsilon_2 < \epsilon_1$. Cylinders 1 and 2 of groups 1 and 2 respectively, move synchronously together. Similarly, cylinders 3 and 4 of groups 1 and 2 respectively, move synchronously together. Further, multi-cylinder engine comprising cylinders 1, 2, 3, and 4, may perform sequential combustion with cylinder 1 firing first, followed by cylinder 3, followed by cylinder 4 and finally followed by cylinder 2. In other words, during sequential combustion, each cylinder operating in a 4-stroke cycle, the even firing order may be 1, 3, 4, and 2.

Here, the cylinders 2, 3 of the second group are formed as activatable cylinders 2, 3 which are deactivated by the controller in part-load operation when a predefinable load is undershot. The cylinders may be deactivated by adjusting intake and exhaust valves during each engine cycle by the controller. In this way, by deactivating cylinders 2, and 3 during part-load operation, the load demand on the cylinders 1, 4 of the first group, which remain in operation, increases and said cylinders then operate under loads with a lower specific fuel consumption. As a result, efficiency may be improved.

Here, it may be considered that the efficiency η correlates more or less with the compression ratio $\epsilon_i$, for example proportionally throughout a selected range. In one example, the efficiency η is generally higher in the case of a relatively high compression ratio $\epsilon_i$ and is generally lower in the case of a relatively low compression ratio $\epsilon_i$. This basic relationship can however break down toward very high compression ratios, because then inter alia the blow-by increases intensely, which has an adverse effect on efficiency.

The different compression ratios $\epsilon_i$ are the result of the configuration of the cylinder groups for different operating states and load ranges. A diesel engine utilizes a certain compression ratio, that is to say a minimum compression ratio, in order to initiate the auto-ignition, in particular upon starting, that is to say upon the first initiation of the combustion when the internal combustion engine is possibly still cold. Compression ratios of $\epsilon i \approx 18$ may for example be used in order to ensure reliable auto-ignition during a cold start if no other measures are implemented that would make a lower compression ratio tolerable. However, from a purely thermodynamic aspect, a compression ratio $\epsilon i \approx 16$ is selected in order to optimize the efficiency of the internal combustion engine.

From that which has been stated above, it follows that the at least one cylinder which is in operation in the lower part-load range should advantageously be provided with a higher compression ratio $\epsilon_1$. The internal combustion engine could then also be reliably started with said at least one cylinder. The at least one cylinder of the second group should then be configured for higher loads, that is to say should be provided with the lower compression ratio $\epsilon_2$. The latter also allows for the higher temperature and pressure levels at relatively high loads. The low compression ratio $\epsilon_2$ possibly reduces the efficiency of the associated second cylinder group, but also reduces the mechanical loading of the engine structure at relatively high loads and also the blow-by in said load range, which in turn yields advantages in terms of efficiency.

From that which has been stated above, it also emerges that the internal combustion engine according to the invention has a higher efficiency η not only in part-load operation but rather also in the range of relatively high loads.

The cylinder groups may also differ from one another with regard to other operating parameters or design features, for example the cooling arrangement, the combustion process, the air ratio λ, the inlet ducts, the outlet ducts and/or the injection nozzles.

The internal combustion engine according to the invention has at least two cylinders or at least two groups with in each case at least one cylinder. In this respect, internal combustion engines with three cylinders which are configured in three groups with in each case one cylinder, or internal combustion engines with six cylinders which are configured in three groups with in each case two cylinders, are likewise internal combustion engines according to the invention. The three cylinder groups may have different compression ratios $\epsilon_i$ and be successively activated, and deactivated individually and independently of one another, as part of a partial deactivation, whereby double switching may also be realized. The partial deactivation is thereby further optimized. The cylinder groups may also comprise a different number of cylinders.

Embodiments of the auto-ignition internal combustion engine may be advantageous in which, in the event of a partial deactivation, the at least one cylinder of the first group is the at least one cylinder which is in operation when the internal combustion engine is in part-load operation, such that, with the higher compression ratio $\epsilon_1$, the efficiency of the internal combustion engine at low loads is optimized, wherein a low load $T_{low}$, that is to say a load in the lower part-load range, is a load which amounts to less than 50%, preferably less than 30%, of the maximum load $T_{max,n}$ at the present rotational speed n.

Embodiments of the auto-ignition internal combustion engine are also advantageous in which both cylinder groups are formed as switchable cylinders. This permits not only an activation but rather also switching between the at least two cylinder groups, and also a combination of switching and activation.

Embodiments of the auto-ignition internal combustion engine are advantageous in which the at least two cylinders form two groups with in each case at least one cylinder.

Two cylinder groups have the advantage over embodiments with several cylinder groups that the control or regulation of the partial deactivation is less complex. It must furthermore be taken into consideration that the realization of mass and moment compensation, which can preferably likewise be activated in parts, is made more difficult by the different compression ratios $\epsilon_1$, and the outlay for this increases considerably with the increase in the number of cylinder groups.

Embodiments of the auto-ignition internal combustion engine are advantageous in which the at least one cylinder of the first group has a compression ratio $\epsilon_1$ and the at least one cylinder of the second group has a compression ratio $\epsilon_2$, where $\epsilon_2+1<\epsilon_1$.

Embodiments of the auto-ignition internal combustion engine are also advantageous in which the at least one cylinder of the first group has a compression ratio $\epsilon_1$ and the at least one cylinder of the second group has a compression ratio $\epsilon_2$, where $\epsilon_2+2<\epsilon_1$.

Embodiments of the auto-ignition internal combustion engine are also advantageous in which the at least one cylinder of the first group has a compression ratio $\epsilon_1$ and the at least one cylinder of the second group has a compression ratio $\epsilon_2$, where $\epsilon_2+3<\epsilon_1$. Whereas the three embodiments above are concerned with the relative difference between the two cylinder groups in terms of compression ratio $\epsilon_i$, the following embodiments relate to the absolute compression ratio of the two groups.

Embodiments of the auto-ignition internal combustion engine are advantageous in which the at least one cylinder of the second group has a compression ratio $\epsilon_2$, where $13<\epsilon_2<17$, preferably $14<\epsilon_2<16.5$.

The at least one cylinder of the second group has a thermodynamically favorable or more favorable compression ratio, with which the efficiency of the second cylinder group and thus also the efficiency $\eta$ of the internal combustion engine can be improved.

Embodiments of the auto-ignition internal combustion engine are also advantageous in which the at least one cylinder of the first group has a compression ratio $\epsilon_1$, where $17<\epsilon_1<20$, preferably $17.5<\epsilon_1<19$.

The at least one cylinder of the first group has a compression ratio which is high enough to ensure a reliable initiation of the auto-ignition, such that said cylinder group is the preferred group at least for the start or cold start of the internal combustion engine.

Embodiments of the auto-ignition internal combustion engine are advantageous in which
at least two groups are characterized by different cylinder volumes $V_i$,
at least one cylinder of the first group having a cylinder volume $V_1$ and at least one cylinder of the second group having a cylinder volume $V_2$, where $V_2 > V_1$.

The provision of two cylinder groups with different cylinder volumes $V_i$ serves in turn for optimization of the partial deactivation. For this purpose, a structural feature of the internal combustion engine or of the cylinders, that is to say the cylinder volume $V_i$, is taken into consideration, specifically in addition to the mandatorily different compression ratios $\epsilon_i$.

The cylinders of the first group have a smaller, preferably considerably smaller, cylinder volume $V_1$, such that—assuming equal numbers of cylinders per group—the major proportion of the overall volume of the internal combustion engine is accounted for by cylinders of the second group and thus by cylinders having a thermodynamically more advantageous compression ratio $\epsilon_2$.

Embodiments of the auto-ignition internal combustion engine are advantageous in which the at least one cylinder of the first group has a cylinder volume $V_1$ and the at least one cylinder of the second group has a cylinder volume $V_2$, where $1 \cdot V_1 < V_2 < 2 \cdot V_1$.

Embodiments of the auto-ignition internal combustion engine are advantageous in which the at least one cylinder of the first group has a cylinder volume $V_1$ and the at least one cylinder of the second group has a cylinder volume $V_2$, where $1.3 \cdot V_1 < V_2 < 2 \cdot V_1$.

Embodiments of the auto-ignition internal combustion engine are advantageous in which the at least one cylinder of the first group has a cylinder volume $V_1$ and the at least one cylinder of the second group has a cylinder volume $V_2$, where $1.3 \cdot V_1 < V_2 < 1.75 \cdot V_1$.

Embodiments of the auto-ignition internal combustion engine are advantageous in which each cylinder is equipped with a direct-injection means for the introduction of fuel.

Here, embodiments are advantageous in which each cylinder is equipped with an injection nozzle for the purposes of direct injection.

Nevertheless, embodiments of the auto-ignition internal combustion engine may be advantageous in which an intake pipe injection means is provided for the purposes of supplying fuel. In this way, an auto-ignition internal combustion engine optimized with regard to a partial deactivation may be achieved.

Figure 3:
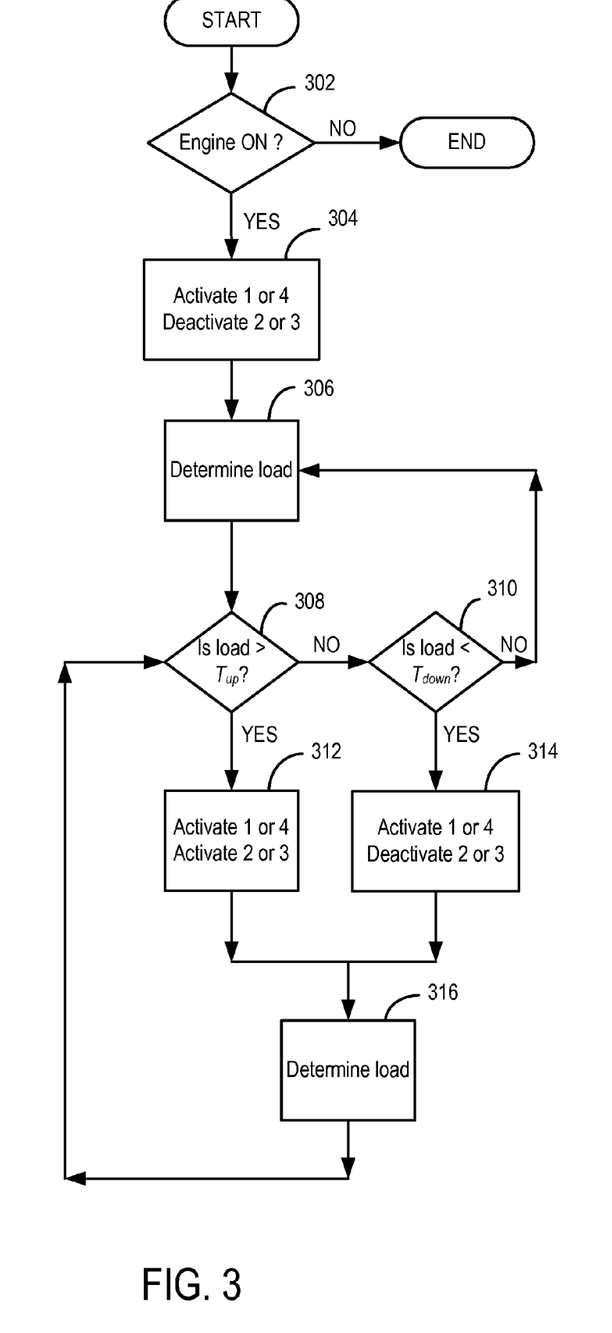
FIG. 3 shows a flow chart illustrating a method for part-load operation of an internal combustion engine.

Now turning to FIG. 3, an example routine is shown for part-load operation of internal combustion engine in which at least one cylinder of group 1 (described at FIG. 2) may be permanently in operation. The example discussed herein illustrates a routine for a four cylinder auto-ignition engine. As discussed above with respect to FIG. 2, four cylinders 1, 2, 3, and 4 may be configured in two groups, wherein group 1 comprises of cylinders 1 and 4, and group 2 comprises of cylinders 2 and 3. Further, the two groups may be characterized by different compression ratios, with compression ratio of group 1 being higher than compression ratio of group 2. In addition, cylinder volume of group 1 may be lower than cylinder volume of group 2.

At 302, it may be determined if an engine on event, which may be an operator induced engine on event, has occurred. Upon confirming the engine on event, at 304, at least one cylinder from group 1 may be operated, and at least one cylinder from group 2 may be deactivated.

Next at 306, current load on the engine may be estimated. Upon estimating the load, at 308, it may be determined if the estimated load has exceeded a predefinable load $T_{up}$. If yes, then at 312, at least one cylinder from group 1 and at least one cylinder from group 2 may be activated. If estimated load is not greater than $T_{up}$ at 308, then at 310, it may be determined whether the load is below a predefinable threshold $T_{down}$. If yes, then at 314, at least one cylinder from group 1 may be activated and at least one cylinder from group 2 may be deactivated. If the estimated load is not less than $T_{down}$, the routine may determine load again and may continue to evaluate load conditions starting from 308, as described above.

In one example, the predefinable limit loads $T_{down}$ and $T_{up}$ may be of equal magnitude, though, in some other examples, $T_{up}$ and $T_{down}$ may also differ in magnitude. When the internal combustion engine is in operation, the cylinders of the first cylinder group are, in the present case, cylinders which are permanently in operation. Only switching of the second cylinder group, that is to say an activation and deactivation of said second group, takes place.

In some examples, at least one cylinder of the second group is deactivated when the predefinable load $T_{down}$ is undershot and the present load remains lower than said predefinable load $T_{down}$ for a predefinable time period $\Delta t_1$.

The introduction of an additional condition for the deactivation of the cylinders of the second group is intended to prevent excessively frequent activation and deactivation, for example, in particular a partial deactivation, if the load falls below the predefinable load $T_{down}$ only briefly and then rises again, or fluctuates around the predefinable value for the load $T_{down}$, without the undershooting justifying or necessitating a partial deactivation.

Similarly, at least one cylinder of the second group is activated when the predefinable load $T_{up}$ is exceeded and the present load remains higher than said predefinable load $T_{up}$ for a predefinable time period $\Delta t_2$.

In this way, embodiments of the auto-ignition internal combustion engine are advantageous in which the at least one cylinder of the second group is formed as an activatable cylinder which is deactivated if a predefinable load $T_{down}$ is undershot and which is activated if a predefinable load $T_{up}$ is exceeded.

The internal combustion engine may be started, and operated at low loads, with the at least one cylinder of the first group. The high compression ratio $\epsilon 1$ of the first group ensures improved efficiency of the internal combustion engine at low loads. The at least one cylinder of the second group is configured for relatively high loads and is activated if a predefinable load $T_{up}$ is exceeded, wherein the at least one cylinder of the first group is a cylinder which is permanently in operation.

Figure 4:
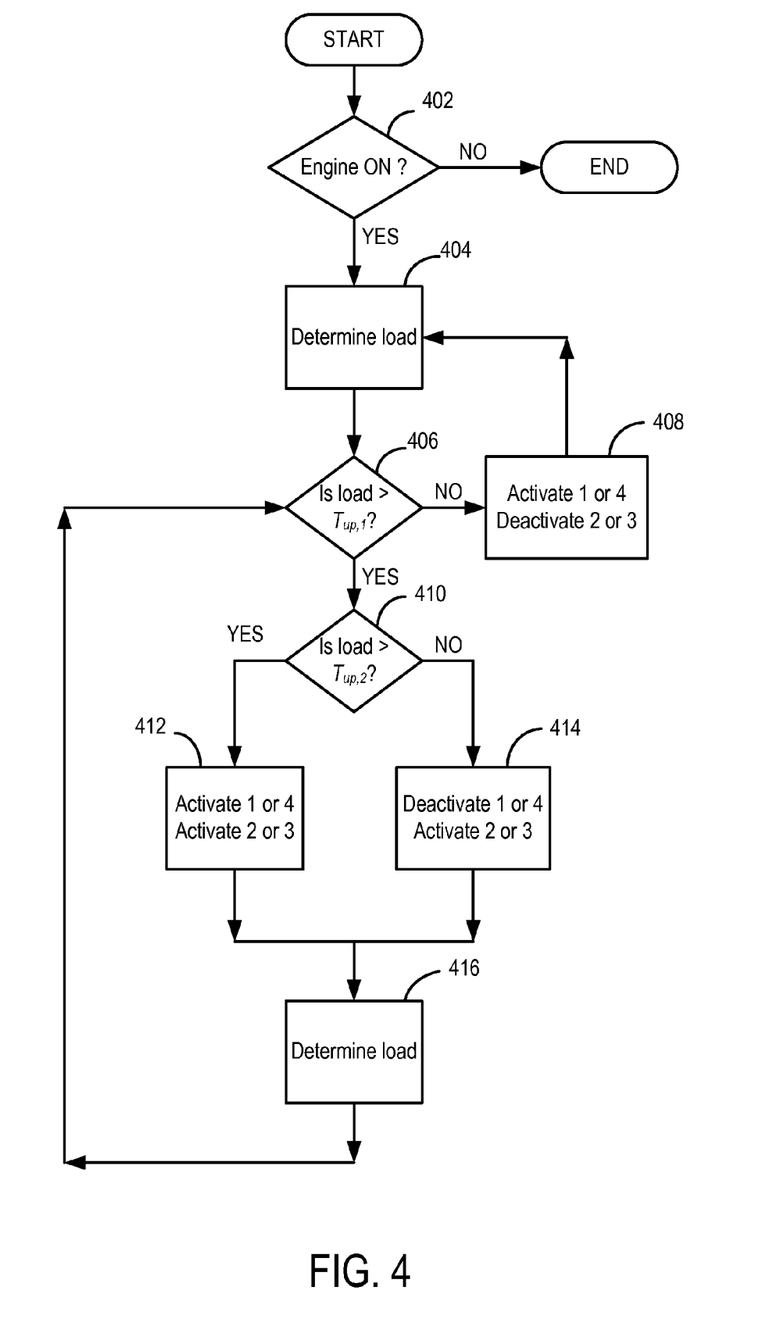
FIG. 4 shows a flow chart illustrating a method for part-load operation of an internal combustion engine.

Now turning to FIG. 4, an example routine is shown for part-load operation of internal combustion engine in which at least one cylinder of group 1 and at least one cylinder of group 2 are formed as switchable cylinders. For example, proceeding from operation of at least one cylinder of the first group at low loads, a switch may be made to at least one cylinder of the second group if a first predefinable load $T_{up,1}$ is exceeded. Group 1 and group 2 may be configured as discussed at FIGS. 2 and 3, wherein group 1 may comprise cylinders 1 and 4 with higher compression ratio and lower volume than group 2 (comprising cylinders 2 and 3).

At 402, it may be determined if engine has been turned on. Herein, the engine on event may be an operator induced engine-on event. Upon confirming an engine-on event, at 404, load may be determined. Load may be dependent on rotational speed of the internal combustion engine. Then, there is not only one specific load, upon the undershooting or exceeding of which switching takes place regardless of the rotational speed n. Instead, a rotational-speed-dependent approach is followed, and a region in the characteristic map is defined in which partial deactivation takes place.

Further, in some examples, parameters of the internal combustion engine, for example the engine temperature or the coolant temperature after a cold start of the internal combustion engine, may be taken into consideration as a criterion for partial deactivation.

Next, upon estimating the load, at 406, it may be determined if the estimated load has exceeded a first predefinable threshold load $T_{up,1}$. If at 406, the estimated load is not greater than $T_{up,1}$, the controller may activate, at 408, at least one cylinder from first group and deactivate at least one cylinder from second group, for example the controller may activate all cylinders from the first group and deactivate all cylinders form the second group. Therefore, proceeding from low loads, firstly, at least one cylinder of the first group is fired, that is, operated, in order to provide the demanded power, while at least one cylinder of the second group is deactivated.

If, at 406, the estimated load is greater than $T_{up,1}$, then the routine may proceed to 410. At 410, it may be determined if the estimated load has exceeded a second predefinable threshold $T_{up,2}$. If the estimated load is greater than $T_{up,1}$ but less than $T_{up,2}$, it may be determined that the engine is operating under increasing load conditions, and at 414, at least one cylinder from the first group may be deactivated and at least one cylinder from the second group may be activated. As a result, with increasing load, switching between the at least two cylinder groups may take place, wherein at least one cylinder of the first group is deactivated and at least one cylinder of the second group is activated when a load $T_{up,1}$ is exceeded. In one example all of the cylinders of the first group are deactivated and all of the cylinders of the second group are activated under such conditions.

At 410, if the estimated load is greater than $T_{up,2}$, at least one cylinder from group one, and optionally all cylinders of group one, may be reactivated at 412. This operation may be advantageous under condition in which, proceeding from operation of at least one cylinder of the second group under progressively increasing load, at least one cylinder of the first group is reactivated if a second predefinable load $T_{up,2}$ is exceeded. In this way, the power output of the internal combustion engine may be further increased.

Next, at 416, upon operating different groups of cylinders based on the estimated load, current load conditions may be determined. Upon determining current load conditions, the routine may continue to 406, and proceed as described above based on the load. In one example, cylinders other than the deactivated and reactivated cylinders of groups 1 and 2 may be maintained in an active state while the engine is in operation.

In this way, embodiments of the method are advantageous in which the fuel supply of a deactivated cylinder is deactivated. Advantages are attained with regard to fuel consumption and pollutant emissions, which assist in achieving the aim pursued by the partial deactivation, specifically reducing fuel consumption and improving efficiency.

It will be appreciated that the configurations disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As will be appreciated by one of ordinary skill in the art, the methods described in FIGS. 3-4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Further, the illustrated steps or functions may be repeatedly performed depending on the particular strategy being used, and may represent instructions or code stored in memory of the controller coupled to the engine.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    operating first and second cylinders of an engine to carry out auto-ignition combustion, the first cylinder having a higher compression ratio, smaller width, and a lower cylinder volume than the second cylinder; and
    deactivating and reactivating each of the first and second cylinders based on engine load compared with respective engine load thresholds, and durations of engine operation in a load range relative to the thresholds.

2. The method of claim 1 wherein during a first load, the first cylinder is activated and the second cylinder is deactivated responsive to the first load remaining below a first threshold load for a first threshold duration, during a second load the first cylinder is deactivated and the second cylinder is activated responsive to the second load remaining above a second threshold load for a second threshold duration, and during a third load, the first and second cylinders are activated responsive to the third load remaining above a third threshold load for a third threshold duration, the first load lower than the second load, which is lower than the third load.

3. The method of claim 1, wherein the first cylinder is part of a first group of cylinders and the second cylinder is part of a second, different group of cylinders, where remaining cylinders in the first and the second groups other than the first and second cylinders are not deactivated during any conditions and are maintained active while the engine is operating.

4. The method of claim 1, further comprising directly injecting fuel to each of the first and second cylinders when reactivated.

5. The method of claim 1, wherein reactivating each of the first and second cylinders includes initiating auto-ignition combustion immediately following a deactivated cylinder cycle.

6. The method of claim 1, wherein a second volume of the second cylinder is less than a first volume of the first cylinder multiplied by two.

7. The method of claim 1, wherein a first compression ratio of the first cylinder is greater than a second compression ratio of the second cylinder plus one.

* * * * *